(12) United States Patent
Sakai et al.

(10) Patent No.: US 9,043,089 B2
(45) Date of Patent: May 26, 2015

(54) ACTUATOR CONTROL APPARATUS

(71) Applicant: JTEKT CORPORATION, Osaka-shi, Osaka (JP)

(72) Inventors: Kazuya Sakai, Kariya (JP); Tsutomu Matsumoto, Anjo (JP); Atsuo Sakai, Okazaki (JP); Kenichi Kozuka, Chita (JP); Takehide Adachi, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/290,061

(22) Filed: May 29, 2014

(65) Prior Publication Data
US 2014/0358375 A1    Dec. 4, 2014

(30) Foreign Application Priority Data

Jun. 4, 2013    (JP) .................................. 2013-117868

(51) Int. Cl.
*B62D 5/04*    (2006.01)
(52) U.S. Cl.
CPC ............ *B62D 5/0463* (2013.01); *B62D 5/0493* (2013.01); *B62D 5/049* (2013.01); *B62D 5/0484* (2013.01); *F16N 2250/00* (2013.01)

(58) Field of Classification Search
CPC .. B62D 5/0484; B62D 5/0463; B62D 5/0493; B62D 5/049
See application file for complete search history.

(56) References Cited

FOREIGN PATENT DOCUMENTS

JP    A-2000-185657    7/2000

*Primary Examiner* — Thomas Tarcza
*Assistant Examiner* — Kevin Myhre
(74) *Attorney, Agent, or Firm* — Oliff PLC

(57) ABSTRACT

There is provided an actuator control apparatus configured such that even when an electronic device that generates an electric signal to be used to control an actuator is provided in the form of a duplexed system, an increase in the number of communication paths between the electronic device and a controller is suppressed. A torque sensor and a rotation angle sensor are each provided in the form of a duplexed system. Two sets of a torque sensor and a rotation angle sensor are connected to a microcomputer via a SPI communication line. The torque sensors and the rotation angle sensors are connected to the microcomputer via CS communication lines, respectively. By selecting a communication target via a corresponding one of the CS communication lines, the microcomputer is able to receive multiple kinds of electric signals via each one of the SPI communication lines.

11 Claims, 5 Drawing Sheets

ACTUATOR CONTROL APPARATUS

INCORPORATION BY REFERENCE

The disclosure of Japanese Patent Application No. 2013-117868 filed on Jun. 4, 2013 including the specification, drawings and abstract, is incorporated herein by reference in its entirety.

BACKGROUND OF THE INVENTION

1. Field of the Invention

The invention relates to an actuator control apparatus.

2. Description of the Related Art

There is a conventional electric power steering system that assists a driver's steering operation by applying driving force generated by a motor to a steering mechanism of a vehicle. A control apparatus of the electric power steering system acquires, for example, a steering torque, a vehicle speed and a value of electric current that is actually supplied to the motor, from various sensors. Then, the control apparatus computes a target current value based on the steering torque and the vehicle speed, and executes feedback control on the motor to make the actual current value coincide with the target current value.

Electric power steering systems are required to have high reliability, and therefore various measures against malfunctions of sensors are taken. For example, an electric power steering system described in Japanese Patent Application Publication No. 2000-185657 (JP 2000-185657 A) includes two torque sensors. Even if one of the two torque sensors of the electric power steering system malfunctions, application of steering assist force to a steering system is continued by utilizing sensor signals generated by the other one of the torque sensors, which is operating properly.

However, in the electric power steering system described in JP 2000-185657 A, the two torque sensors are individually connected to a control apparatus, and thus it is necessary to provide the control apparatus with a terminal used to connect the backup torque sensor to the control apparatus in addition to a terminal used to connect the main torque sensor to the control apparatus. Further, making other sensors redundant has been under consideration. Thus, the control apparatus needs to be provided with more terminals as the number of sensors increases. The same applies to control apparatuses that control actuators on the basis of information acquired from various electronic devices including sensors.

SUMMARY OF THE INVENTION

One object of the invention is to provide an actuator control apparatus configured such that even when an electronic device that generates an electric signal to be used to control an actuator is provided in the form of a duplexed system, an increase in the number of communication paths between the electronic device and a controller is suppressed.

An actuator control apparatus according to an aspect of the invention includes: a first electronic device that generates an electric signal to be used to control an actuator; a second electronic device that has a function different from a function of the first electronic device, and that generates an electric signal to be used to control the actuator; a third electronic device that has the same function as the function of the second electronic device, and that generates an electric signal to be used to control the actuator; a fourth electronic device that has the same function as the function of the first electronic device, and that generates an electric signal to be used to control the actuator; a controller that controls the actuator based on the electric signals generated by the first to fourth electronic devices; a first serial bus that connects the first and second electronic devices to the controller; and a second serial bus that connects the third and fourth electronic devices to the controller.

According to the above aspect, two electrical devices having the same function are provided. Thus, even if one of the same kind of two electrical devices malfunctions, the controller is able to continue controlling the actuator using an electric signal generated by the remaining electronic device operating properly. Further, each set of electronic devices composed of two electronic devices that are different in function from each other is connected to the controller via a single serial bus. That is, the two electronic devices share the single serial bus, so that an increase in the number of communication paths between the electronic devices and the controller is suppressed. Even if one of the two serial buses malfunctions, the controller is able to acquire electric signals generated by the different kinds of two electronic devices via the remaining serial bus operating properly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
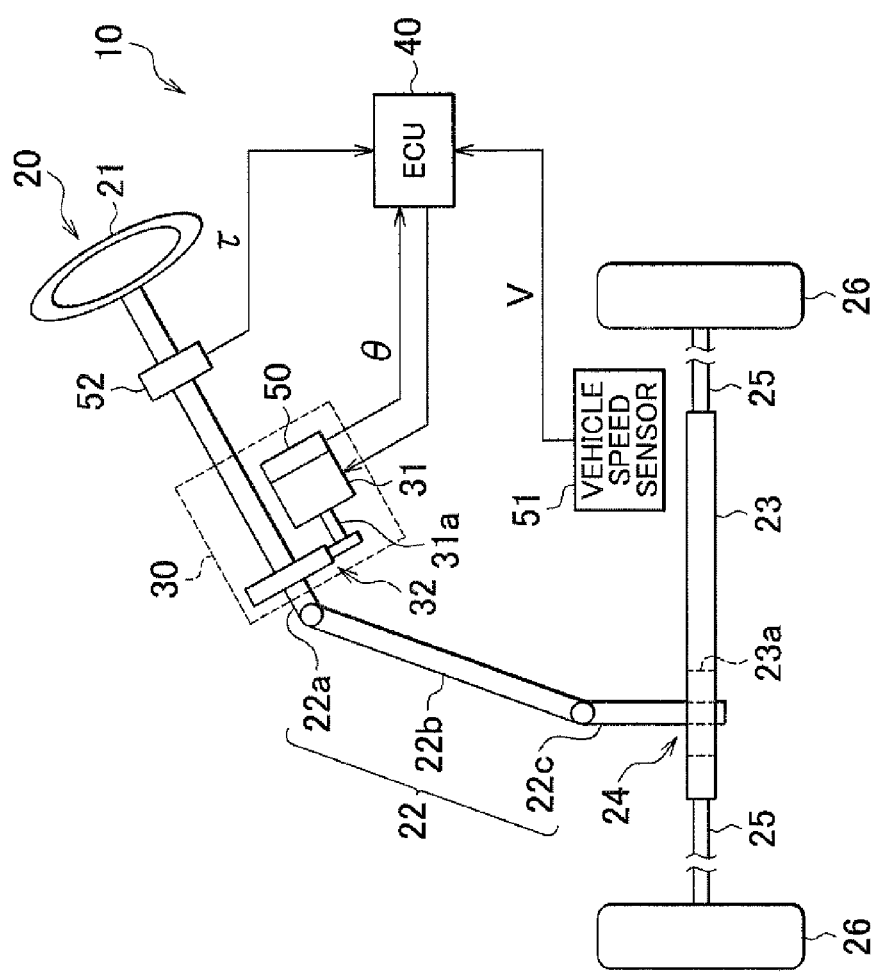
FIG. 1 is a block diagram illustrating the configuration of an electric power steering system according to an embodiment of the invention.

Hereinafter, an actuator control apparatus according an embodiment of the invention will be described with reference to the accompanying drawings. In the present embodiment, the actuator control apparatus according to the invention is applied to an electric power steering system for a vehicle. The schematic configuration of the electric power steering system will be described below. As illustrated in FIG. 1, an electric power steering system 10 includes a steering mechanism 20 that steers steered wheels 26 in response to a driver's steering operation, a steering assist mechanism 30 that assists the driver's steering operation, and an electronic control unit (ECU) 40 that controls the operation of the steering assist mechanism 30. Note that, an electric power steering system is abbreviated as "EPS".

The steering mechanism 20 includes a steering wheel 21 operated by a driver, and a steering shaft 22 that rotates together with the steering wheel 21. The steering shaft 22 includes a column shaft 22a connected to the steering wheel 21, an intermediate shaft 22b connected to a lower end portion of the column shaft 22a, and a pinion shaft 22c connected to a lower end portion of the intermediate shaft 22b. A lower end portion of the pinion shaft 22c is meshed with a rack shaft 23 (more specifically, a portion 23a in which rack teeth are formed) that extends in a direction that intersects with the pinion shaft 22c. Thus, the rotary motion of the steering shaft 22 is converted into a linear reciprocating motion of the rack shaft 23 by a rack-and-pinion mechanism 24 including the pinion shaft 22c and the rack shaft 23. The linear reciprocating motion is transmitted to right and left steered wheels 26 via tie rods 25 respectively connected to opposite ends of the rack shaft 23. In this way, the steered angle of the steered wheels 26 is changed.

The steering assist mechanism 30 includes a motor 31 that is a generation source of steering assist force. As the motor 31, for example, a brushless motor is adopted. A rotary shaft 31a of the motor 31 is connected to the column shaft 22a via a speed reducer 32. The speed reducer 32 reduces the speed of rotation output from the motor 31, and transmits the rotation with a reduced speed to the column shaft 22a. The torque generated by the motor 31 is applied to the steering shaft 22 as steering assist force (assist force), and thus a driver's steering operation is assisted.

The ECU 40 acquires the detection results obtained by various sensors provided in the vehicle, as information indicating a command from the driver or a travelling state, and controls the motor 31 according to the acquired various information. The various sensors include, for example, a vehicle speed sensor 51, a torque sensor 52 and a rotation angle sensor 53. The vehicle speed sensor 51 is provided in the vehicle to detect a vehicle speed (vehicle traveling speed) V. The torque sensor 52 is provided on the column shaft 22a to detect a steering torque τ applied to the steering shaft 22. The rotation angle sensor 53 is provided on the motor 31 to detect a rotation angle θ of the rotary shaft 31a. The ECU 40 computes a target assist torque based on the vehicle speed V and the steering torque τ. The ECU 40 controls the motor 31. The control of the motor 31 executed by the ECU 40 is vector control based on the rotation angle θ of the motor 31. The ECU 40 executes feedback control of electric currents that are supplied to the motor 31 such that the assist torque that is applied from the motor 31 to the column shaft 22a coincides with the target assist torque.

Figure 2:
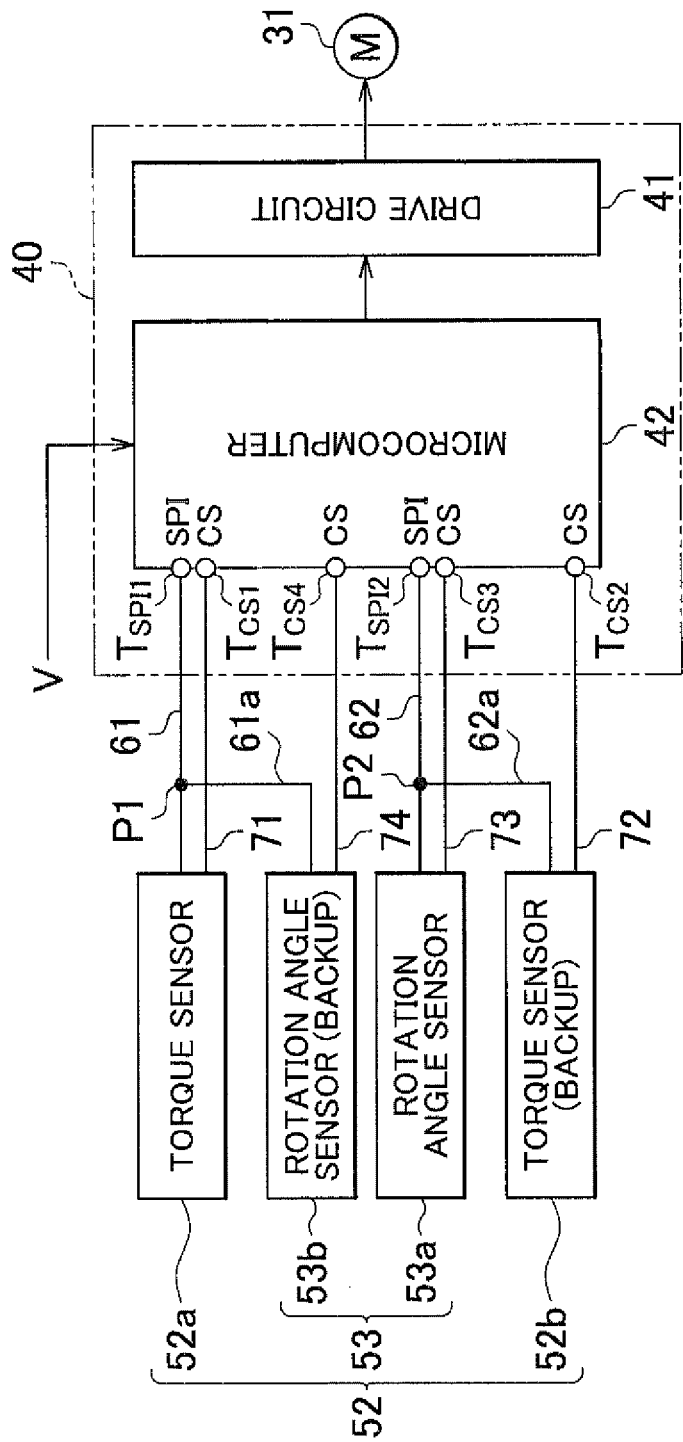
FIG. 2 is a block diagram illustrating a state of connection between an electronic control unit and sensors in the embodiment.

In the present embodiment, the torque sensor 52 and the rotation angle sensor 53 are each provided in the form of a duplexed system from the viewpoint of securing the operation reliability of the electric power steering system 10. Specifically, as illustrated in FIG. 2, the torque sensor 52 includes a main torque sensor 52a and a backup torque sensor 52b. Each of the torque sensors 52a, 52b is a digital torque sensor with Serial Peripheral Interface (SPI), and generates a digital signal corresponding to the detected steering torque τ. Note that, SPI (Serial Peripheral Interface) is a kind of standards of synchronous serial communication. The rotation angle sensor 53 includes a main rotation angle sensor 53a and a backup rotation angle sensor 53b. Each of the rotation angle sensors 53a, 53b is a digital rotation angle sensor with SPI, and generates a digital signal corresponding to the detected rotation angle θ.

Next, the configuration of the ECU 40 will be described. As illustrated in FIG. 2, the ECU 40 includes a motor drive circuit (inverter circuit) 41 and a microcomputer 42.

The motor drive circuit 41 converts direct-current electric power supplied from a direct-current electric power source, such as a battery, into three-phase alternating-current electric power, based on a motor drive signal (PWM signal) generated by the microcomputer 42. The thus-obtained three-phase alternating-current electric power is supplied to the motor 31.

The microcomputer 42 takes in the detection results obtained by the vehicle speed sensor 51, the torque sensor 52 and the rotation angle sensor 53 individually with prescribed sampling periods, and generates a motor drive signal on the basis of the detection results. The microcomputer 42 has the function of detecting malfunctions of the torque sensor 52 and the rotation angle sensor 53.

Next, connection methods will be described. The torque sensors 52a, 52b, the rotation angle sensors 53a, 53b and the microcomputer 42 are connected to each other as follows.

As illustrated in FIG. 2, the main torque sensor 52a and the backup rotation angle sensor 53b are connected to a SPI terminal $T_{SPI1}$ of the microcomputer 42 via a SPI communication line (SPI bus) 61. More precisely, the SPI communication line 61 has a branch line 61a that branches off from a branch point P1 that is set in an intermediate portion of the SPI communication line 61. The rotation angle sensor 53b is connected to the branch point P1 of the SPI communication line 61 via the branch line 61a. The two devices (the torque sensor 52a and the rotation angle sensor 53b) and the microcomputer 42 share the single SPI communication line 61 through which digital signals are transferred therebetween.

The main rotation angle sensor 53a and the backup torque sensor 52b are connected to a SPI terminal $T_{SPI2}$ of the microcomputer 42 via a SPI communication line 62. More specifically, the SPI communication line 62 has a branch line 62a that branches off from a branch point P2 that is set in an intermediate portion of the SPI communication line 62. The torque sensor 52b is connected to the branch point P2 of the SPI communication line 62 via the branch line 62a. The two devices (the rotation angle sensor 53a and the torque sensor 52b) and the microcomputer 42 share the single SPI communication line 62 through which digital signals are transferred therebetween.

Although each of the SPI communication lines 61, 62 is made up of three communication lines that are an SCK (serial clock) line, a SDI (serial data input) line and a SDO (serial data output) line, the SPI communication lines 61, 62 are each indicated by a single continuous line in the drawings, for ease of explanation.

The two torque sensors 52a, 52b are connected, via CS (Chip Select) signal lines 71, 72, to CS terminals $T_{CS1}$, $T_{CS2}$ of the microcomputer 42, respectively. The two rotation angle sensors 53a, 53b are connected to CS terminals $T_{CS3}$, $T_{CS4}$ of the microcomputer 42 via CS signal lines 73, 74, respectively. The CS signal lines 71 to 74 are used when the microcomputer 42 selects (or identifies) its communication target.

The microcomputer 42, which is a master device in the SPI communication, selects each of the sensors, which are slave devices in the SPI communication, as its communication target, by activating a corresponding one of the CS terminal $T_{CS1}$ to $T_{CS4}$ to which the CS signal line 71 to 74 are connected, for example, turning the logic level thereof to a low level. The microcomputer 42 controls a selected one of the sensors via a corresponding one of the SPI communication lines 61, 62. For example, the microcomputer 42 sends a clock signal to each sensor or takes in the detection results obtained by each sensor via a corresponding one of the SPI communication lines 61, 62. The torque sensor 52, the rotation angle sensor 53, the SPI communication lines 61, 62 and the microcomputer 42 described above constitute the actuator control apparatus.

Next, operations of the microcomputer 42 will be described. The microcomputer 42 takes in the detection results obtained by the torque sensor 52a and the rotation angle sensor 53b alternately via the SPI communication line 61 by alternately activating the two CS terminals $T_{CS1}$, $T_{CS4}$ to which the torque sensor 52a and the rotation angle sensor 53b are connected, with a prescribed period. Similarly, the microcomputer 42 takes in the detection results obtained by the rotation angle sensor 53a and the torque sensor 52b alternately via the SPI communication line 62 by alternately activating the two CS terminals $T_{CS3}$, $T_{CS2}$ to which the rotation angle sensor 53a and the torque sensor 52b are connected, with a prescribed period. The period with which the CS terminals $T_{CS1}$, $T_{SC4}$ of the SPI communication line 61 are switched is the same as the period with which the CS terminals $T_{CS3}$, $T_{CS2}$ of the SPI communication line 62 are switched. Thus, the microcomputer 42 simultaneously takes in the detection results obtained by the torque sensor 52a and the rotation angle sensor 53a, and then simultaneously takes in the detection results obtained by the torque sensor 52b and the rotation angle sensor 53b.

The microcomputer 42 executes malfunction detection on the torque sensor 52 on the basis of the detection results obtained by the torque sensor 52a and the torque sensor 52b. The microcomputer 42 executes malfunction detection on the rotation angle sensor 53 on the basis of the detection results obtained by the rotation angle sensor 53a and the rotation angle sensor 53b. As a concrete detection method, a known method is adopted as needed, for example, a method in which the detection results obtained by the two sensors are compared with each other, and if the difference therebetween falls outside an allowable range, it is determined that there is a malfunction.

When neither the torque sensor 52 nor the rotation angle sensor 53 malfunctions, the microcomputer 42 generates a motor drive signal on the basis of the detection results obtained by the main torque sensor 52a and the main rotation angle sensor 53a. The microcomputer 42 is capable of quickly and accurately generating the motor drive signal based on the detection results obtained by the torque sensor 52a and the rotation angle sensor 53a that are simultaneously taken into the microcomputer 42.

On another hand, when the microcomputer 42 generates a motor drive signal based on the detection results obtained by the torque sensor 52a and the rotation angle sensor 53b, there occurs a difference between the timings at which the detection results obtained by the two sensors are respectively taken into the microcomputer 42, because the single SPI communication line is used for the communication. Similarly, when the microcomputer 42 generates a motor drive signal based on the detection results obtained by the torque sensor 52b and the rotation angle sensor 53a, there occurs a difference between the timings at which the detection results obtained by the two sensors are respectively taken into the microcomputer 42. Such a timing difference makes it difficult to generate an accurate motor drive signal. Furthermore, in these cases, even if the detection result obtained by one of the torque sensor and the rotation angle sensor is taken into the microcomputer 42, the microcomputer 42 is able to generate a motor drive signal only after taking in the detection result obtained by the other one of the torque sensor and the rotation angle sensor. This makes it difficult to promptly generate a motor drive signal.

When a malfunction is detected in the main torque sensor 52a or the rotation angle sensor 53a, the microcomputer 42 generates a motor drive signal based on the detection result obtained by the backup torque sensor 52b or the backup rotation angle sensor 53b instead of the detection result obtained by the sensor in which malfunction is detected.

Next, the operation of the connection method illustrated in FIG. 2 will be described. The torque sensor 52a and the rotation angle sensor 53b are connected to the single SPI terminal $T_{SPI1}$ via the SPI communication line 61. Similarly, the torque sensor 52b and the rotation angle sensor 53a are connected to the single SPI terminal $T_{SPI2}$ via the SPI communication line 62. That is, the communication paths between the two sets of sensors, each set being made up of two kinds of sensors different from each other in function, and the microcomputer 42 form a duplexed system in which the two paths are completely independent of each other. Therefore, if one of the communication paths of the two systems malfunctions, the microcomputer 42 uses the remaining communication path to take in the detection results obtained by the torque sensor 52a and the rotation angle sensor 53b or the detection results obtained by the torque sensor 52b and the rotation angle sensor 53a.

Figure 3:
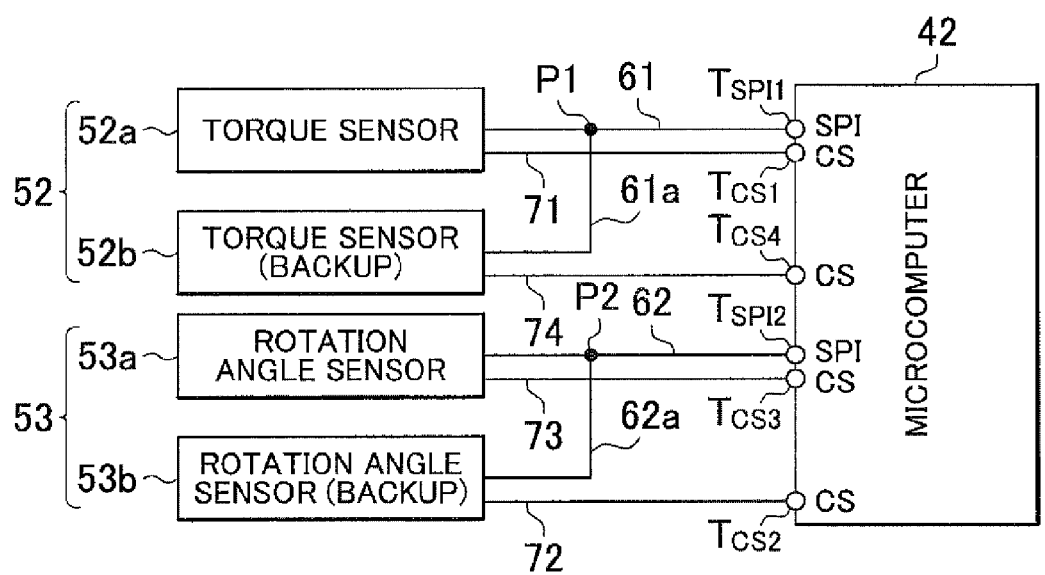
FIG. 3 is a block diagram illustrating another state of connection between the electronic control unit and the sensors.

The torque sensors 52a, 52b, the rotation angle sensors 53a, 53b and the microcomputer 42 may be connected to each other in the following method. As illustrated in FIG. 3, the two torque sensors 52a, 52b are connected to the single SPI terminal $T_{SPI1}$ via the single SPI communication line 61. Similarly, the two rotation angle sensors 53a, 53b are connected to the single SPI terminal $T_{SPI2}$ via the single SPI communication line 62. With this configuration as well, if one of the two torque sensors 52a, 52b malfunctions or one of the two rotation angle sensors 53a, 53b malfunctions, the microcomputer 42 uses the other one of the torque sensors or the other one of the rotation angle sensors to generate a motor drive signal.

However, if one of the communication paths of the two systems malfunctions, the microcomputer 42 is able to take in only one of the steering torque τ and the rotation angle θ. This makes it difficult to generate an appropriate motor drive signal. However, the connection method described above with reference to FIG. 2 does not cause such a problem.

Therefore, according to the present embodiment, the following advantageous effects are obtained.

1) The torque sensor 52 and the rotation angle sensor 53, which generate signals that are particularly important to maintain the functions of the electric power steering system 10, are each provided in the form of a duplexed system. Thus, even if one of the two torque sensors 52a, 52b malfunctions, it is possible to continue to control the motor 31 based on the detection result obtained by the remaining torque sensor operating properly. The same applies to the rotation angle sensor 53.

2) Further, the two sets of sensors, each set being made up of two kinds of sensors different from each other in function (one torque sensor and one rotation angle sensor), are connected to the microcomputer 42 via two independent SPI communication lines 61, 62, respectively. By selecting a communication target through activation of a corresponding one of the CS terminals $T_{CS1}$ to $T_{CS4}$, the microcomputer 42 is able to receive a plurality of signals (the steering torque τ and the rotation angle θ) via each one of the SPI communication lines 61, 62. Thus, the number of terminals (more specifically, the number of SPI terminals) provided for the microcomputer 42 is smaller than that when the two torque sensors 52a, 52b and the two rotation angle sensors 53a, 53b are individually connected to the microcomputer 42 via respective SPI communication lines. Hence, it is possible to construct the electric power steering system 10 in which the communication paths between the two sets of sensors and the microcomputer 42 are independent of each other, while minimizing the number of communication paths between the two sets of sensors and the microcomputer 42.

3) The torque sensors 52a, 52b and the rotation angle sensors 53a, 53b are digital sensors that generate digital signals corresponding to the detected physical quantities. The digital signal generated by each of the sensors is taken into the microcomputer 42 via a corresponding one of the SPI communication lines 61, 62. The noise immunity is higher than that when analog signals are transferred between the sensors and the microcomputer 42. In addition to the detection results obtained by the sensors, information other than the detection results obtained by the sensors may be transferred between the sensors and the microcomputer 42. In this respect as well, the digital communication method is more preferable than the analog communication method.

The foregoing embodiment may be modified as follows.

Figure 4:
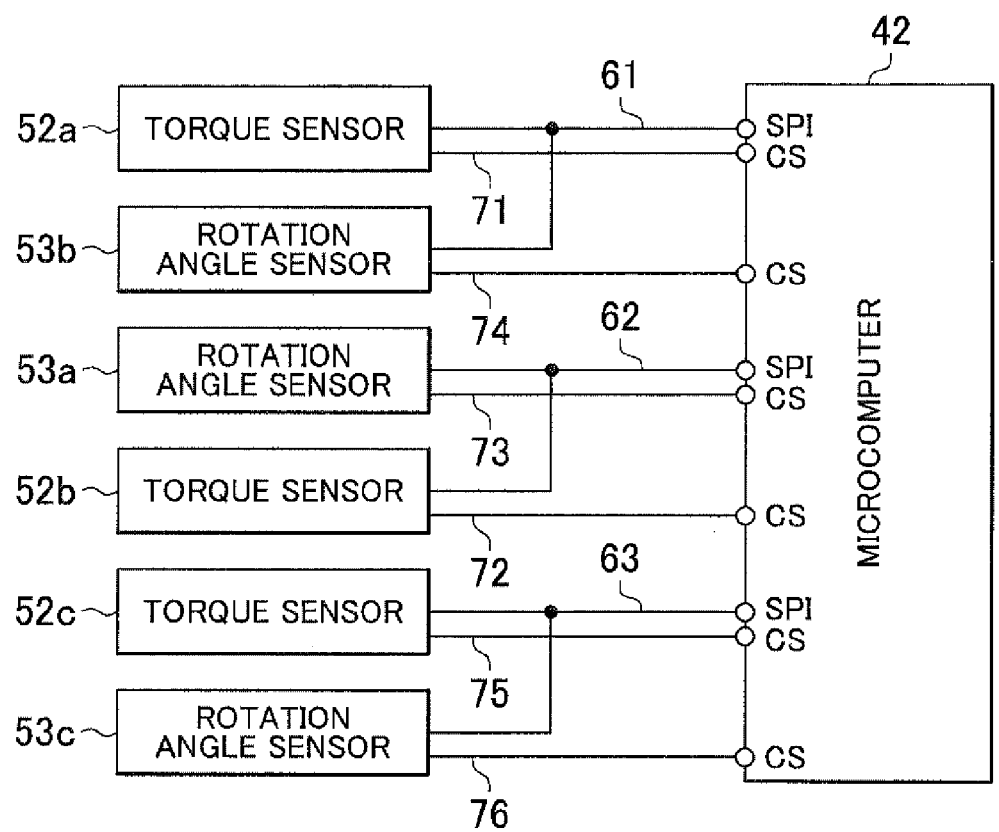
FIG. 4 is a block diagram illustrating a state of connection between an electronic control unit and sensors according to another embodiment of the invention.

A) In the foregoing embodiment, the torque sensor 52 and the rotation angle sensor 53 are each provided in the form of a duplexed system. Alternatively, each of the torque sensor 52 and the rotation angle sensor 53 may be provided in the form of a triplexed system. As illustrated in FIG. 4, a third set of a torque sensor 52*c* and a rotation angle sensor 53*c* is additionally provided. The torque sensor 52*c* and the rotation angle sensor 53*c* are connected to the microcomputer 42 via a SPI communication line 63. The torque sensor 52*c* and the rotation angle sensor 53*c* are connected to the microcomputer 42 via CS signal lines 75, 76, respectively. With this configuration, the reliability of the electric power steering system 10 is improved by subjecting the detection results obtained by the three torque sensors 52*a*, 52*b*, 52*c* to majority decision and subjecting the detection results obtained by the three rotation angle sensors 53*a*, 53*b*, 53*c* to majority decision. For example, the detection results obtained by two of the three torque sensors 52*a*, 52*b*, 52*c* coincide with each other but differ from the detection result obtained by the remaining one of the three torque sensors 52*a*, 52*b*, 52*c*, it is determined that the detection result obtained by the remaining one of the three torque sensors 52*a*, 52*b*, 52*c* is wrong. Consequently, it is possible to identify the torque sensor that malfunctions. The same applies to the rotation angle sensor 53*a* to 53*c*.

B) In the foregoing embodiment, a set of sensors is composed of one of the torque sensors constituting the torque sensor 52 and one of the rotation angle sensors constituting the rotation angle sensor 53. However, the combination of sensors in one set may be changed as needed. For example, other sensors, such as an electric current sensor that detects the electric current supplied to the motor 31, a temperature sensor that detects the temperature of the motor drive circuit 41 or the motor 31, and a voltage sensor that detects each phase voltage of the motor 31, may each be provided in the form of a duplexed system. Then, two sensors different from each other in function may be combined into one set, and may be connected to the microcomputer 42 via a SPI communication line.

C) In the foregoing embodiment, two sensors different in function from each other (one torque sensor and one rotation angle sensor) are connected to a single SPI terminal. Alternatively, three or more sensors may be connected to a single SPI terminal. For example, the vehicle speed sensor 51 may be provided in the form of a duplexed system, and each set of sensors composed of one torque sensor, one rotation angle sensor and one vehicle speed sensor may be connected to a corresponding single SPI terminal. Note that, the number of sensors that can be connected to a single SPI terminal is determined according to the communication speed that is permitted on the basis of, for example, the product specifications.

D) In the foregoing embodiment, two sensors different in function from each other (one torque sensor and one rotation angle sensor) are connected to a single SPI terminal. However, the components that are connected to a SPI terminal are not limited to the various sensors, and any electronic devices that generate digital signals used in the microcomputer 42 may be connected to a SPI terminal. For example, a subsidiary microcomputer (sub-microcomputer) that covers part of the functions of the microcomputer 42 or monitors whether the microcomputer 42 malfunctions may be provided. Further, a microcomputer (backup sub-microcomputer) that backs up the sub-microcomputer may be provided. In this case, the following connection method may be adopted.

Figure 5:
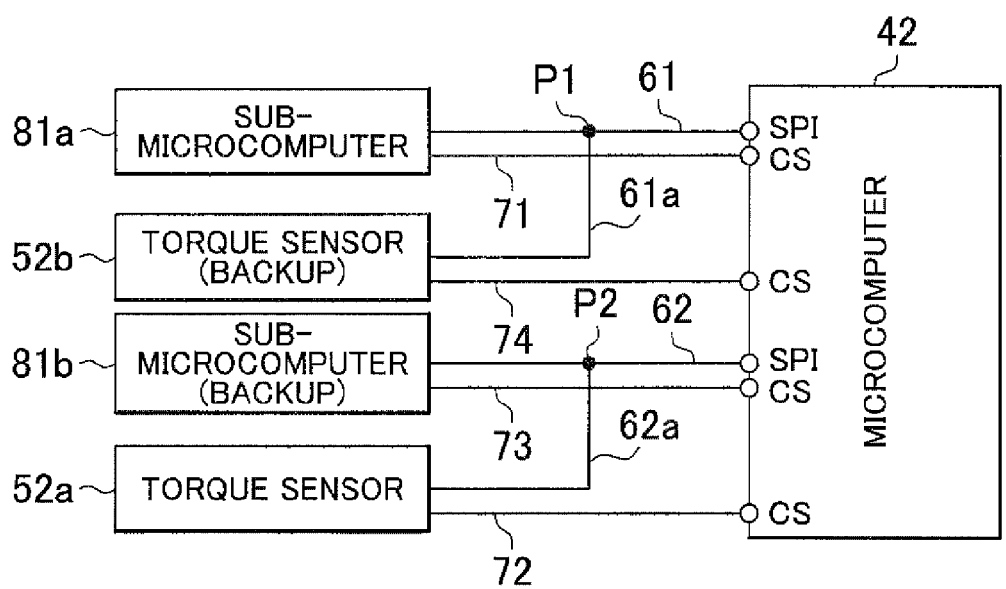
FIG. 5 is a block diagram illustrating a state of connection between an electronic control unit and sensors according to yet another embodiment of the invention.

That is, as illustrated in FIG. 5, a set of a subsidiary microcomputer 81*a* and a torque sensor 52*b* is connected to the main microcomputer 42 via the SPI communication line 61. Furthermore, a set of a subsidiary microcomputer 81*b* and a torque sensor 52*a* is connected to the microcomputer 42 via a SPI communication line 62. In this case, the microcomputers 81*a*, 81*b* are also components of the actuator control apparatus.

E) In the foregoing embodiment, the SPIs are adopted as serial buses (serial communication lines) that connect the sensors to the microcomputer 42. However, I2Cs (Inter-Integrated-Circuits) may adopted instead of the SPIs. The I2C is a synchronous serial communication method in which communication is carried out through two signal lines that are a SCL (serial clock) line and a bidirectional SDA (serial data) line. A plurality of slave devices (the torque sensor and the rotation angle sensor in the foregoing embodiment) may be connected to each of the I2C buses, as in the case of the SPI buses. The microcomputer 42, which is the master device, selects its communication target by designating the address of one of slave devices for which addresses are individually set.

F) In the foregoing embodiment, the actuator control apparatus according to the invention is applied to the electric power steering system 10. Alternatively, the actuator control apparatus may be applied to other electric devices. For example, the actuator control apparatus according to the invention may also be applied to a control apparatus for an electric pump for a vehicle. The control apparatus for an electric pump takes in information, such as the engine rotation speed, the oil temperature, and the oil pressure, and controls the oil discharge rate through the control of a motor based on the information. The actuator control apparatus according to the invention may be applied to a drive force distribution apparatus for a four-wheel-drive vehicle. The control apparatus, which is applied to the drive force distribution device, takes in information, such as the road wheel speed and the degree of throttle opening, and controls the friction contact force between clutch plates that make a pair by controlling the electric power to be supplied to an electromagnetic solenoid on the basis of the information. In this way, the ratio of distribution of drive force of the transmission to the front and rear wheels is adjusted. Furthermore, the devices to which the actuator control apparatus according to the invention is applied are not limited to in-vehicle devices. For example, the actuator control apparatus according to the invention is applicable to control apparatuses for machine tools such as machining centers.

What is claimed is:

1. An actuator control apparatus comprising:
   a first electronic device that generates an electric signal to be used to control an actuator;
   a second electronic device that has a function different from a function of the first electronic device, and that generates an electric signal to be used to control the actuator;
   a third electronic device that has the same function as the function of the second electronic device, and that generates an electric signal to be used to control the actuator;
   a fourth electronic device that has the same function as the function of the first electronic device, and that generates an electric signal to be used to control the actuator;

a controller that controls the actuator based on the electric signals generated by the first to fourth electronic devices;
a first serial bus that connects the first and second electronic devices to the controller; and
a second serial bus that connects the third and fourth electronic devices to the controller.

2. The actuator control apparatus according to claim 1, wherein the controller controls the actuator by using the electric signals generated by the first and third electronic devices, and uses the electric signals generated by the second and fourth electronic devices as backup signals.

3. The actuator control apparatus according to claim 1, further comprising:
a fifth electronic device that has the same function as the function of the first electronic device, and that generates an electric signal to be used to control the actuator;
a sixth electronic device that has the same function as the function of the second electronic device, and that generates an electric signal to be used to control the actuator; and
a third serial bus that connects the fifth and sixth electronic devices to the controller.

4. The actuator control apparatus according to claim 2, further comprising:
a fifth electronic device that has the same function as the function of the first electronic device, and that generates an electric signal to be used to control the actuator;
a sixth electronic device that has the same function as the function of the second electronic device, and that generates an electric signal to be used to control the actuator; and
a third serial bus that connects the fifth and sixth electronic devices to the controller.

5. The actuator control apparatus according to claim 1, further comprising:
multiple kinds of additional electronic devices that have functions different from the functions of the first and second electronic devices, that generate electric signals to be used to control the actuator, and that are regular additional electronic devices that operate as regular devices;
multiple kinds of additional electronic devices that have the same functions as the regular additional electronic devices, that generate electric signals to be used to control the actuator, and that are backup additional electronic devices that operate as backup devices;
a first serial bus that connects the first and second electronic devices to the controller, and that further connects the regular additional electronic devices to the controller; and
a second serial bus that connects the third and the fourth electronic devices to the controller, and that further connects the backup additional electronic devices to the controller.

6. The actuator control apparatus according to claim 1, wherein:
the first electronic device is a sub-controller that covers part of a function of the controller, or monitors whether the controller malfunctions; and
the fourth electronic device is a backup controller that backs up the sub-controller.

7. The actuator control apparatus according to claim 1, wherein the actuator is a motor that is a drive source of an electric power steering system.

8. The actuator control apparatus according to claim 1, wherein:
the first and fourth electronic devices are torque sensors that detect a steering torque; and
the second and third electronic devices are rotation angle sensors that detect a rotation angle of a motor that generates steering assist force.

9. The actuator control apparatus according to claim 3, wherein:
the fifth electronic device is the torque sensor; and
the sixth electronic device is the rotation angle sensor for a motor.

10. The actuator control apparatus according to claim 1, wherein the actuator is a motor that is a drive source of an electric pump for a vehicle.

11. The actuator control apparatus according to claim 1, wherein the actuator is an electromagnetic solenoid of a drive force distribution apparatus of a four-wheel-drive vehicle.

* * * * *